UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF PRODUCING CYANIDS AND CYANAMIDS.

1,022,351.  Specification of Letters Patent.  Patented Apr. 2, 1912.

No Drawing.  Application filed April 5, 1910.  Serial No. 553,655.

*To all whom it may concern:*

Be it known that we, CARL BOSCH, Ph. D., and ALWIN MITTASCH, Ph. D., chemists, subjects, respectively, of the King of Prussia and the King of Saxony, residing at Ludwigshafen-on-the-Rhine, Germany, have invented new and useful Improvements in Processes of Producing Cyanids and Cyanamids, of which the following is a specification.

In the specification of Letters Patent No. 923,012 we have described the production of cyanids and cyanamids of the alkaline metals and alkaline earth metals by heating a titanium nitrid with carbon in the presence of certain defined metallic compounds.

We have now discovered that cyanids and cyanamids of the alkaline metals or of the alkaline earth metals can easily be obtained by heating aluminium nitrid or a silicon nitrid (under which term we include both the nitrids and also the carbid-nitrids of silicon) with carbon in the presence of an oxid or carbonate or sulfate or other salt of an alkaline metal or alkaline earth metal. If desired, a mixture of two or more of such metallic oxids or salts can be employed. In carrying out this reaction, it is preferable, in order to avoid as far as possible a loss of nitrogen, to maintain the temperature as low as possible consistent with the production of a homogeneous melt. The carbon may be employed, for instance, in the form of soot, or coal, or of a compound containing carbon (such for instance as pitch), and instead of these, or in addition thereto, gases capable of yielding carbon, such for instance as acetylene, may be passed into the heated mixture.

Instead of using the pure nitrids of silicon or aluminium, mixtures thereof with one another or with other nitrids such for instance as are obtained from the technically easily accessible oxid compounds or mixtures can be employed. Such mixtures of nitrids are generally advantageous since they melt at a lower temperature and can more easily be converted into the cyanogen compounds.

The process of our invention has the advantage over that described in Letters Patent No. 923,012 that the nitrids employed contain a higher percentage of nitrogen and consequently melts richer in cyanids and cyanamids can be obtained.

The following examples will serve to illustrate further the nature of our invention and how it can be carried into practical effect, but the invention is not confined to these examples. The parts are by weight.

Example 1: Mix together five parts of silicon nitrid (obtained for instance by heating finely powdered quartz, charcoal powder and sodium carbonate for from 10–12 hours in a current of nitrogen, at a temperature of from 1300–1400° C., the said method being described and claimed in the co-pending application Serial No. 529,641), fifteen parts of anhydrous sodium carbonate, and one part of soot, and then heat the whole to a red heat for a considerable time, while excluding gases which have an oxidizing action. The product obtained consists chiefly of a mixture of sodium cyanid and sodium silicate, and for many purposes can be directly employed instead of the cyanid of commerce.

Example 2: Melt together, at a bright red heat, three parts of aluminium nitrid (obtained, for example, from alumina, carbon, and nitrogen at a high temperature), twelve parts of a molecular mixture of potassium carbonate and sodium carbonate, and two parts of finely powdered charcoal, until the evolution of carbon monoxid ceases. The product can be worked up in any suitable manner for the production of pure cyanid. The reaction can be carried out, if desired, in the presence of crude alkaline cyanid which acts as a flux and promotes reaction, or any other suitable flux may be employed instead.

Example 3: Mix together two parts of aluminium-silicon-titanium nitrid (obtained for instance by heating China clay, titanium-ironsand and carbon in the presence of a current of nitrogen gas for twelve hours at a temperature of from fourteen hundred to fifteen hundred degrees centigrade, said method being described and claimed in the co-pending application Serial No. 529,641), seven parts of sodium carbonate, and one part of ground charcoal, and heat the whole, for one hour, at a red heat.

Now what we claim is:—

1. The production of cyanids and cyanamids of the alkali metals and of the alkaline earth metals by heating aluminium nitrid and silicon nitrids with carbon in the pressure of a hereinbefore defined metallic compound.

2. The production of cyanids and cyanamids of the alkali metals and of the alkaline earth metals by heating aluminium nitrid and silicon nitrids with carbon in the presence of a hereinbefore defined metallic compound and of a flux.

3. The production of sodium cyanid by heating silicon nitrid with carbon in the presence of a sodium salt.

4. The production of sodium cyanid by heating silicon nitrid with carbon in the presence of sodium carbonate.

In testimony whereof we have hereunto set our hands in the presence of two subscribing witnesses.

CARL BOSCH.
ALWIN MITTASCH.

Witnesses:
ERNEST L. IVES,
A. RAUSHINGER.

---

It is hereby certified that in Letters Patent No. 1,022,351, granted April 2, 1912, upon the application of Carl Bosch and Alwin Mittasch, of Ludwigshafen-on-the-Rhine, Germany, for an improvement in "Processes of Producing Cyanids and Cyanamids," an error appears in the printed specification requiring correction as follows: Page 2, line 6, for the word "pressure" read *presence;* and that the said Letters Patent should be read with this correction therein that the same may conform to the record of the case in the Patent Office.

Signed and sealed this 28th day of May, A. D., 1912.

[SEAL.]

C. C. BILLINGS,
*Acting Commissioner of Patents.*

Now what we claim is:—

1. The production of cyanids and cyanamids of the alkali metals and of the alkaline earth metals by heating aluminium nitrid and silicon nitrids with carbon in the pressure of a hereinbefore defined metallic compound.

2. The production of cyanids and cyanamids of the alkali metals and of the alkaline earth metals by heating aluminium nitrid and silicon nitrids with carbon in the presence of a hereinbefore defined metallic compound and of a flux.

3. The production of sodium cyanid by heating silicon nitrid with carbon in the presence of a sodium salt.

4. The production of sodium cyanid by heating silicon nitrid with carbon in the presence of sodium carbonate.

In testimony whereof we have hereunto set our hands in the presence of two subscribing witnesses.

CARL BOSCH.
ALWIN MITTASCH.

Witnesses:
ERNEST L. IVES,
A. RAUSHINGER.

---

It is hereby certified that in Letters Patent No. 1,022,351, granted April 2, 1912, upon the application of Carl Bosch and Alwin Mittasch, of Ludwigshafen-on-the-Rhine, Germany, for an improvement in "Processes of Producing Cyanids and Cyanamids," an error appears in the printed specification requiring correction as follows: Page 2, line 6, for the word "pressure" read *presence;* and that the said Letters Patent should be read with this correction therein that the same may conform to the record of the case in the Patent Office.

Signed and sealed this 28th day of May, A. D., 1912.

[SEAL.]

C. C. BILLINGS,
*Acting Commissioner of Patents.*

It is hereby certified that in Letters Patent No. 1,022,351, granted April 2, 1912, upon the application of Carl Bosch and Alwin Mittasch, of Ludwigshafen-on-the-Rhine, Germany, for an improvement in "Processes of Producing Cyanids and Cyanamids," an error appears in the printed specification requiring correction as follows: Page 2, line 6, for the word "pressure" read *presence;* and that the said Letters Patent should be read with this correction therein that the same may conform to the record of the case in the Patent Office.

Signed and sealed this 28th day of May, A. D., 1912.

[SEAL.]

C. C. BILLINGS,

*Acting Commissioner of Patents.*